United States Patent
Baldea et al.

(10) Patent No.: US 9,682,357 B2
(45) Date of Patent: Jun. 20, 2017

(54) CATALYTIC PLATE REACTORS

(71) Applicant: BOARD OF REGENTS, THE UNIVERSITY OF TEXAS SYSTEM, Austin, TX (US)

(72) Inventors: Michael Baldea, Austin, TX (US); Richard Chase Pattison, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 8 days.

(21) Appl. No.: 14/427,597

(22) PCT Filed: Aug. 12, 2013

(86) PCT No.: PCT/US2013/054560
§ 371 (c)(1),
(2) Date: Mar. 11, 2015

(87) PCT Pub. No.: WO2014/042800
PCT Pub. Date: Mar. 20, 2014

(65) Prior Publication Data
US 2015/0217259 A1    Aug. 6, 2015

Related U.S. Application Data

(60) Provisional application No. 61/701,831, filed on Sep. 17, 2012.

(51) Int. Cl.
*B01J 19/00* (2006.01)
*C01B 3/38* (2006.01)
(Continued)

(52) U.S. Cl.
CPC .......... *B01J 19/0093* (2013.01); *B01J 23/42* (2013.01); *B01J 23/89* (2013.01); *C01B 3/384* (2013.01); *F28D 20/02* (2013.01); *B01J 2219/0079* (2013.01); *B01J 2219/0086* (2013.01); *B01J 2219/0095* (2013.01); *B01J 2219/00783* (2013.01); *B01J 2219/00822* (2013.01);
(Continued)

(58) Field of Classification Search
CPC combination set(s) only.
See application file for complete search history.

(56) References Cited

U.S. PATENT DOCUMENTS 5,722,482 A * 3/1998 Buckley .................... A61F 7/02
165/10
7,754,935 B2    7/2010 Brophy et al.
(Continued)

FOREIGN PATENT DOCUMENTS

WO    WO-2014/042800 A1    3/2014

*Primary Examiner* — Kaity Chandler
(74) *Attorney, Agent, or Firm* — Meunier Carlin & Curfman LLC

(57) ABSTRACT

A method of controlling the temperature of autothermal microchannel reactors is disclosed. A hierarchical control structure employs a distributed temperature controller including a phase change material and a supervisory control system including the control of one or more inputs into the reactor. The phase change material acts as a fast, distributed controller, and the supervisory controller acts over a longer time horizon to mitigate persistent disturbances. A stochastic optimization method for selecting the phase change layer thickness is employed.

21 Claims, 11 Drawing Sheets

(51) Int. Cl.
  *B01J 23/42* (2006.01)
  *B01J 23/89* (2006.01)
  *F28D 20/02* (2006.01)

(52) U.S. Cl.
  CPC ............. *B01J 2219/00835* (2013.01); *B01J 2219/00873* (2013.01); *B01J 2219/00891* (2013.01); *B01J 2219/00894* (2013.01); *B01J 2219/00959* (2013.01); *B01J 2219/00961* (2013.01); *B01J 2219/00995* (2013.01); *C01B 2203/0233* (2013.01); *C01B 2203/0244* (2013.01); *C01B 2203/062* (2013.01); *C01B 2203/0811* (2013.01); *C01B 2203/107* (2013.01); *C01B 2203/1058* (2013.01); *C01B 2203/1241* (2013.01); *C01B 2203/141* (2013.01); *C01B 2203/1614* (2013.01); *Y02E 60/145* (2013.01); *Y02P 20/52* (2015.11)

(56) References Cited

U.S. PATENT DOCUMENTS

| | | |
|---|---|---|
| 8,048,383 B2 | 11/2011 | Tonkovich et al. |
| 2004/0033174 A1* | 2/2004 | Bruck ................ B01J 19/2485 422/179 |
| 2004/0034266 A1* | 2/2004 | Brophy ............... B01J 19/0093 585/658 |
| 2004/0076562 A1* | 4/2004 | Manzanec ........... B01J 19/0093 422/198 |
| 2004/0101722 A1* | 5/2004 | Faye ................. H01M 8/04014 429/440 |
| 2004/0141893 A1 | 7/2004 | Martin |
| 2004/0220434 A1 | 11/2004 | Brophy et al. |
| 2006/0150509 A1* | 7/2006 | Suzuki ................ B01J 8/0257 48/127.9 |
| 2011/0009653 A1 | 1/2011 | Mazanec et al. |
| 2013/0105759 A1* | 5/2013 | Cheng ................ H01L 45/06 257/5 |

* cited by examiner the United States of America, vol. 108, no. 20, pp. 8172-8176, 2011; N. Muradov, F. Smith, and A. T. Raissi, "Hydrogen production by catalytic processing of renewable methane-rich gases," Int. J. of Hydrogen Energy, vol. 33, no. 8, pp. 2023-2035, 2008. Localized production facilities should be efficient, robust and scalable at low throughput.
CATALYTIC PLATE REACTORS

CROSS-REFERENCES TO RELATED APPLICATIONS

This application claims priority to U.S. Provisional Application No. 61/701,831, filed Sep. 17, 2012 titled "CATALYTIC PLATE REACTORS", which is hereby incorporated by reference in its entirety.

BACKGROUND

The present disclosure generally relates to catalytic plate reactors. In various examples, methods for designing and operating catalytic plate reactors employed in steam methane reforming are described.

The rapid development of distributed methane sources (e.g., shale gas formations and landfill capture, gas associated with oil or coal deposits) has augmented the technological push for localized processing of methane for the production of easily transportable or high value chemicals and fuels, such as Fischer-Tropsch products and hydrogen. See, for example, A. Burnham, J. Han, C. Clark, M. Wang, J. Dunn, and I. Palou-Rivera, "Life-Cycle Greenhouse Gas Emissions of Shale Gas, Natural Gas, Coal, and Petroleum," Env. Sci. & Tech., vol. 46, no. 2, pp. 619-627, 2012; S. Kemball-Cook, A. Bar-Ilan, J. Grant, L. Parker, J. Jung, W. Santamaria, J. Mathews, and G. Yarwood, "Ozone Impacts of Natural Gas Development in the Haynesville Shale," Env. Sci. & Tech., vol. 44, no. 24, pp. 9357-9363, 2010; D. Kargbo, R. Wilhelm, and D. Campbell, "Natural Gas Plays in the Marcellus Shale: Challenges and Potential Opportunities," Env. Sci. & Tech., vol. 44, no. 15, pp. 5679-5684, 2010; R. Howarth, R. Santoro, and A. Ingraffea, "Methane and the greenhouse-gas footprint of natural gas from shale formations," Climate Change, vol. 106, no. 4, pp. 679-690, 2011; S. Osborn, A. Vengosh, N. Warner, and R. Jackson, "Methane contamination of drinking water accompanying gas-well drilling and hydraulic fracturing," Proceedings of the National Academy of Sciences of the United States of America, vol. 108, no. 20, pp. 8172-8176, 2011; N. Muradov, F. Smith, and A. T. Raissi, "Hydrogen production by catalytic processing of renewable methane-rich gases," Int. J. of Hydrogen Energy, vol. 33, no. 8, pp. 2023-2035, 2008. Localized production facilities should be efficient, robust and scalable at low throughput.

Catalytic plate microreactors (CPRs) have proven to be one of the most successful and promising solutions in this area. See, for example, S. Becht, R. Franke, A. Geisselmann, and H. Hahn, "An industrial view of process intensification," Chem. Eng. and Proc., vol. 48, no. 1, pp. 329-332, 2009; M. Mettler, G. Stefanidis, and D. Vlachos, "Scale-out of Microreactor Stacks for Portable and Distributed Processing: Coupling of Exothermic and Endothermic Processes for Syngas Production," Ind. Eng. Chem. Res., vol. 49, no. 21, pp. 10 942-10 955, 2010; S. Karagiannidis and J. Mantzaras, "Numerical investigation on the start-up of methane-fueled catalytic microreactors," Combustion and Flame, vol. 157, no. 7, pp. 1400-1413, 2010; M. Mettler, G. Stefanidis, and D. Vlachos, "Enhancing stability in parallel plate microreactor stacks for syngas production," Chem. Eng. Sci., vol. 66, no. 6, pp. 1051-1059, 2011. CPRs consist of alternating millimeter-sized channels, separated by catalyst-coated plates. In the case of steam-methane reforming, the endothermic reforming reactions are supported by the exothermic catalytic combustion of methane, occurring in parallel, alternate channels. CPRs can achieve higher conversions than conventional reactors with an order-of-magnitude reduction in catalyst volume. See, for example, G. Kolios, J. Frauhammer, and G. Eigenberger, "Efficient reactor concepts for coupling of endothermic and exothermic reactions," Chem. Eng. Sci., vol. 57, no. 9, pp. 1505-1510, 2002, 2nd International Symposium on Multifunctional Reactors (ISMR-2), Nurnberg, Germany, Jun. 25-28, 2001; M. Zanfir and A. Gavriilidis, "Catalytic combustion assisted methane steam reforming in a catalytic plate reactor," Chem. Eng. Sci., vol. 58, no. 17, pp. 3947-3960, 2003; M. Baldea and P. Daoutidis, "Dynamics and control of autothermal reactors for the production of hydrogen," Chem. Eng. Sci., vol. 62, pp. 3218-3230, 2007; M. Zanfir, M. Baldea, and P. Daoutidis, "Optimizing the Catalyst Distribution for Countercurrent Methane Steam Reforming in Plate Reactors," AIChE J., vol. 57, no. 9, pp. 2518-2528, 2011. However, the aforementioned studies have also indicated several potential operational issues, such as flow maldistribution and local temperature rises ("hotspots") with deleterious effects on the integrity of the catalyst coatings and supporting plates. Several design modifications have been proposed to mitigate these issues, including using a distributed catalyst activity, distributed fuel feeds, reverse flow configurations or offsetting the catalyst coating in the reforming and combustion channels. See, for example, M. Zanfir and A. Gavriilidis, "Influence of flow arrangement in catalytic plate reactors for methane steam reforming," Chem. Eng. Res. & Des., vol. 82, no. A2, pp. 252-258, February 2004, 3rd International Symposium on Multifunctional Reactors (ISMR3)/18th Colloquia on Chemical Reaction Engineering (CCRE18), Bath, England, 2003; G. Kolios, B. Glockler, A. Gritsch, A. Morino, and G. Eigenberger, "Heat-integrated reactor concepts for hydrogen production by methane steam reforming," Fuel Cells, vol. 5, no. 1, pp. 52-65, 2005; M. van Sint Annaland and R. Nijssen, "A novel reverse flow reactor coupling endothermic and exothermic reactions: an experimental study," Chem. Eng. Sci., vol. 57, no. 22-23, pp. 4967-4985, 2002; R. Ramaswamy, P. Ramachandran, and M. Dudukovic, "Recuperative coupling of exothermic and endothermic reactions," Chem. Eng. Sci., vol. 61, no. 2, pp. 459-472, 2006; M. Zanfir, M. Baldea, and P. Daoutidis, "Optimizing the Catalyst Distribution for Countercurrent Methane Steam Reforming in Plate Reactors," AIChE J., vol. 57, no. 9, pp. 2518-2528, 2011.

Furthermore, CPRs operation is subject to fluctuations in the quality of the feedstock, including changes in pressure, purity and composition with potentially serious operational consequences. For example, a rapid change in methane composition can cause significant temperature increases in the reactor. In addition, practical considerations pertaining to the design and dimensions of CPRs may limit the availability of distributed measurements (e.g., the constructive challenges and cost of locating temperature sensors in a multi-plate stack) and actuators (e.g., it may not be economically feasible to control the flow to each channel).

SUMMARY

In a first aspect, there is provided an autothermal catalytic plate reactor including a set of reforming channels and a set of combustion channels, in an alternating, layered arrangement and separated by a distributed temperature control layer. The reforming channels include a layer of reforming catalyst. The combustion channels include a layer of combustion catalyst. The distributed temperature control layer includes a phase change material in thermal communication with the adjacent reforming channel and combustion channel. In the most general aspect, a set of endothermic chemical reactions occurs in the endothermic channels, while a set of exothermic chemical reactions occurring in the exothermic channels provides the thermal energy (heat) required for the endothermic reactions to proceed.

In another aspect, there is provided a method for producing synthesis gas from methane and steam using an autothermal catalytic plate reactor disclosed herein. The method includes receiving methane and steam into the reforming channels and methane and oxygen, or methane and air into the combustion channels. The method further includes allowing the methane and oxygen, or methane and air to contact and react on the combustion catalyst layer thereby producing a combustion heat. The method further includes allowing the distributed temperature controller to regulate the distribution of the combustion heat to the reforming layers. The method further includes allowing the methane and steam to contact the reforming catalyst layers thereby producing a synthesis gas.

In another aspect, there is provided a method of stochastically optimizing the geometry of the distributed temperature controller of the autothermal catalytic plate reactor disclosed herein. The method includes defining one or more potential operating disturbances in the autothermal catalytic plate reactor as pseudo-random multi-level signals; imposing the pseudo-random multi-level signal disturbance on a simulated autothermal catalytic plate reactor system during time-integration steps in an dynamic optimization algorithm; and adjusting the geometry of the distributed temperature controller to minimize the effects of one or more potential disturbances.

DETAILED DESCRIPTION

In the following description, various embodiments are described. For purposes of explanation, specific configurations and details are set forth in order to provide a thorough understanding of the embodiments. It will also be apparent to one skilled in the art that the present invention can be practiced without the specific details described herein. Furthermore, well-known features may be omitted or simplified in order not to obscure the embodiment being described.

The autothermal catalytic reactor disclosed herein is suitable for producing synthesis gas (syngas, a mixture of hydrogen and carbon monoxide) via methane-steam reforming. A distributed temperature controller is based on the use of a layer of phase-change material (PCM) confined between reactor plates. The melting-solidification cycles of the PCM mitigate temperature excursions occurring due to fluctuations in the methane-steam mixture flow rate and/or in feedstock composition. A novel stochastic optimization method is also disclosed for selecting the PCM layer thickness (i.e., for distributed controller "tuning").

Figure 1A:
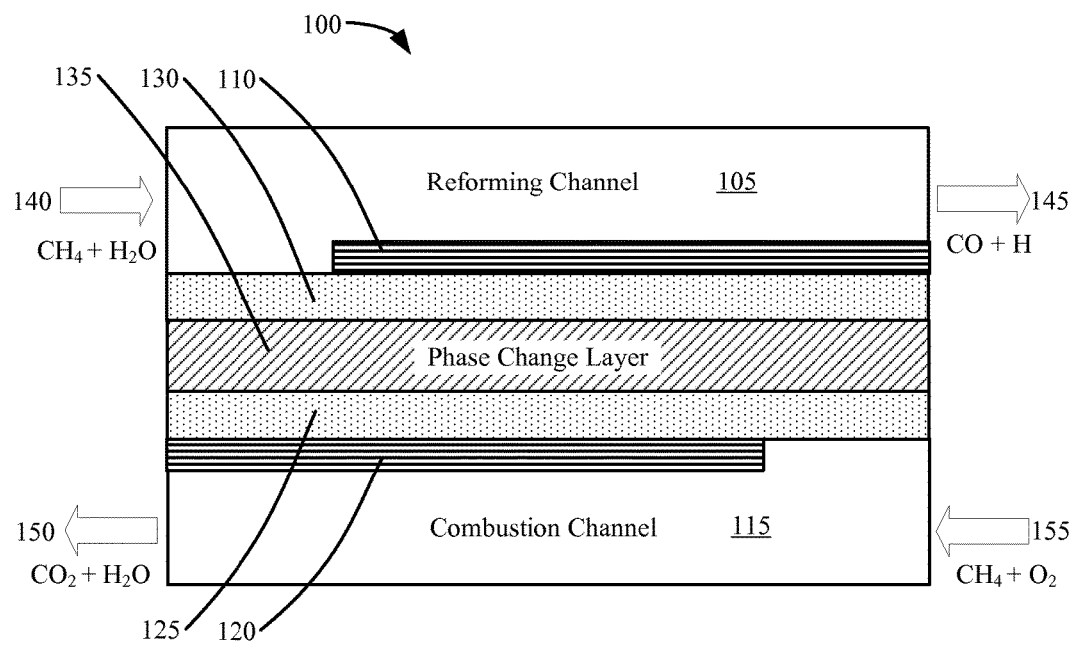
FIG. 1A is a cross-sectional diagram of an autocatalytic microchannel reactor in accordance with the description herein.

FIG. 1A shows a cross-section view of an example two layer autothermal catalytic reactor 100. Enclosed reforming channel 105 and enclosed combustion channel 115 comprise the two layers of the reactor 100 and are layered in an alternating configuration. Although two channels are shown in FIG. 1A, other embodiments may include four, six, eight or more layered alternating reforming channels and combustion channels. Enclosed channels 105, 115 may be configured to transport one or more substances through reactor 100. Enclosed channels 105, 115 are separated by a reforming wall plate 130 and a combustion wall plate 125. Between wall plates 125, 130 is a phase change layer 135 that may perform the function of a distributed temperature controller. Phase change layer 135 may be thermally coupled to reforming channel 105 and combustion channel 115. Reforming wall plate 130 may be coated with a reforming catalyst layer 110 disposed within reforming channel 105. In some embodiments reforming catalyst layer 110 may include, but is not limited to platinum. Combustion wall plate 125 may be coated with a combustion catalyst layer 120 disposed within combustion channel 115. In some embodiments combustion catalyst layer 120 may include, but is not limited to nickel. In some embodiments, catalyst layers 110, 120 may not extend the entire length of their respective channels. In some embodiments catalyst layers 110, 120 may start at a distance from the inlet.

In the embodiment illustrated in FIG. 1A, reforming channel 105 is configured to catalyze a mixture of methane and steam in a reforming reaction that produces a combination of carbon monoxide and hydrogen. Combustion channel 115 is configured to catalyze a mixture of methane and oxygen (or methane and air) in a combustion reaction that produces a combination of carbon dioxide and water.

Exothermic thermal energy from combustion channel 115 is conducted through combustion wall plate 125, through phase change layer 135, through reforming wall plate 130 and to reforming channel 105 to support the endothermic reforming reaction. In one embodiment, reforming channel 105 is configured to receive methane derived from a natural gas source. In some embodiments, the natural gas source is a stranded natural gas deposit or an associated natural gas deposit. In further embodiments other substances may be transported in enclosed channels 105, 115 including other gasses and/or liquids.

In one embodiment, phase change layer 135 has a high thermal conductivity to facilitate the efficient transport of thermal energy from combustion channel 115 to reforming channel 105. Phase change layer 135 may have a melting temperature above the steady state "normal" catalytic reactor 100 temperature. When disturbances within catalytic reactor 100 would otherwise cause temperature excursions in the reactor, phase change layer 135 may melt and absorb excess thermal energy in the form of latent heat without appreciably raising the temperature within the reactor. Accordingly, phase change layer 135 may prevent temperature excursions during disturbances by absorbing latent heat at effectively constant temperature. In some embodiments, high temperatures can jeopardize the structural integrity of catalytic plate reactors and can potentially deactivate or destroy catalysts 110, 120.

Figure 1B:
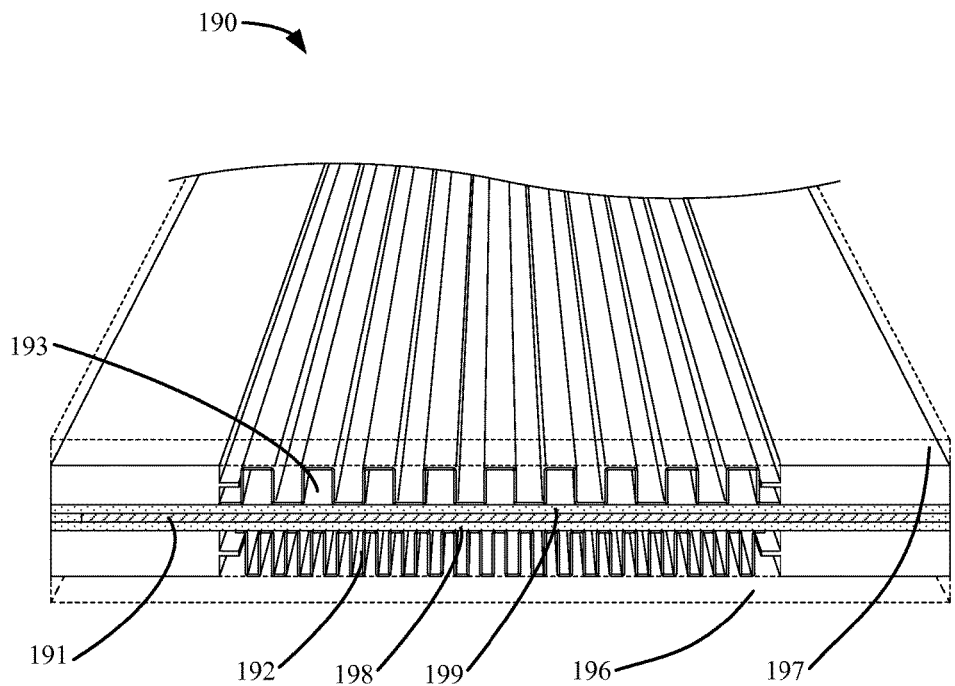
FIG. 1B is an isometric diagram of an autocatalytic microchannel reactor in accordance with the description herein.

FIG. 1B illustrates an isometric view of an example autothermal catalytic reactor 190 having multiple layers of reforming channels and combustion channels. Enclosed reforming channel 192 and enclosed combustion channel 193 may be of any configuration. FIG. 1B illustrates that enclosed combustion channel 193 may have straight walls as shown in section 193, or in other embodiments the combustion channel may contain internal fins, such as saw tooth walls, castellated walls, or any other type of wall, such as but not limited to, serpentine, grooved or any other design. Enclosed reforming channels 192 may also have walls of varied geometry as discussed above with reference to combustion channel 193. In some embodiments, reforming channel 192 and combustion channel 193 may be enclosed by reforming channel plate 196 and combustion channel plate 197, respectively. The width and geometry of enclosed reforming channels 192 and enclosed combustion channels 193 may vary depending on the design parameters of reactor 190. Phase change layer 191 may have a melting temperature above the steady state "normal" catalytic reactor 190 temperature. Exothermic thermal energy from combustion channel 193 is conducted through combustion wall plate 199, through phase change layer 191, through reforming wall plate 198 and to reforming channel 192 to support the endothermic reforming reaction.

Figure 1C:
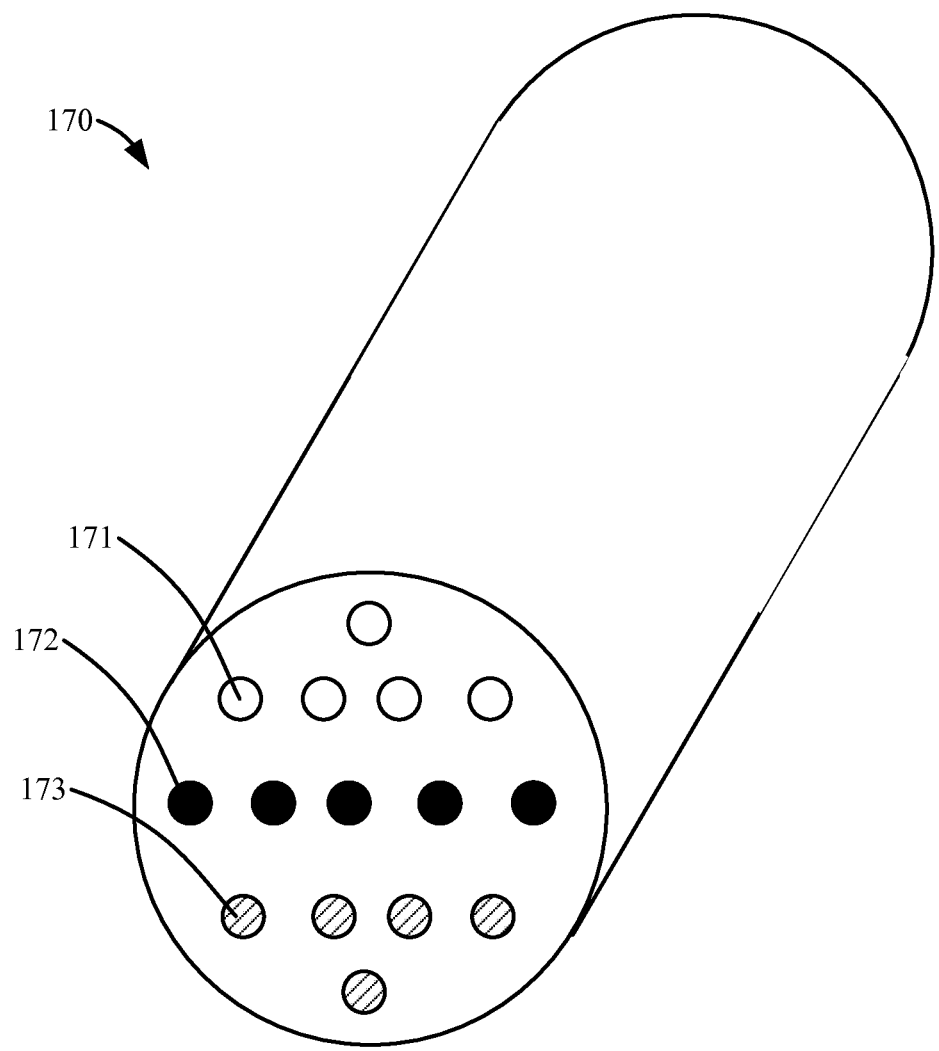
FIG. 1C is an isometric diagram of an autocatalytic microchannel reactor in accordance with the description herein.

FIG. 1C illustrates an isometric view of an example autothermal catalytic reactor 170 having multiple layers of reforming channels 171 and combustion channels 173. Enclosed reforming channel 171 and enclosed combustion channel 173 may be of any configuration as discussed herein. Phase change layer 172 may have a melting temperature above the steady state "normal" catalytic reactor 170 temperature. Phase change layer 172 may be a series of rods as illustrated or may be a flat plate of material as disclosed above. Myriad configurations of autothermal catalytic reactor 170 may be employed without departing from the invention.

FIG. 1B illustrates that enclosed combustion channel 191 may have straight walls as shown in section 193, or contain internal fins, such as the saw tooth walls as shown in section 194, the castellated walls as shown in section 195, or any other type of wall, such as but not limited to, serpentine, grooved or any other design. Enclosed reforming channels 192 may also have walls of varied geometry. In some embodiments, reforming channel 192 and combustion channel 191 may be enclosed by reforming channel plate 196 and combustion channel plate 197, respectively. The width and geometry of enclosed reforming channels 192 and enclosed combustion channels 191 may vary depending on the design parameters of reactor 190.

Figure 2:
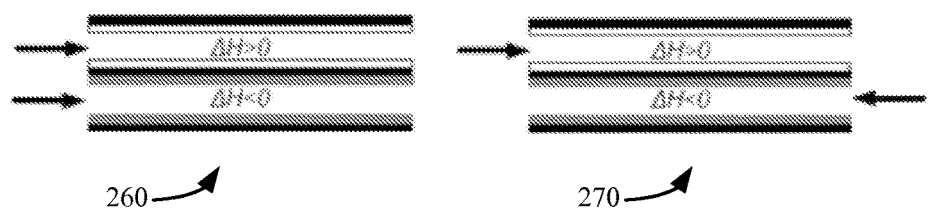
FIG. 2 is a cross-sectional diagram of a concurrent flow and a countercurrent flow autocatalytic microchannel reactor in accordance with the description herein.

As illustrated in FIG. 2, autothermal catalytic reactor 100 may be configured to operate in co-current flow mode 260 or in counter-current flow mode 270. In co-current flow mode 260, the flow through the reforming channel is in the same direction as the flow through the combustion channel. In counter-current flow mode 270 the flow through the combustion channel is opposite the flow through the reforming channel. In some embodiments, the combustion channel and the reforming channel of the autothermal catalytic plate reactor are approximately parallel.

Figure 3:
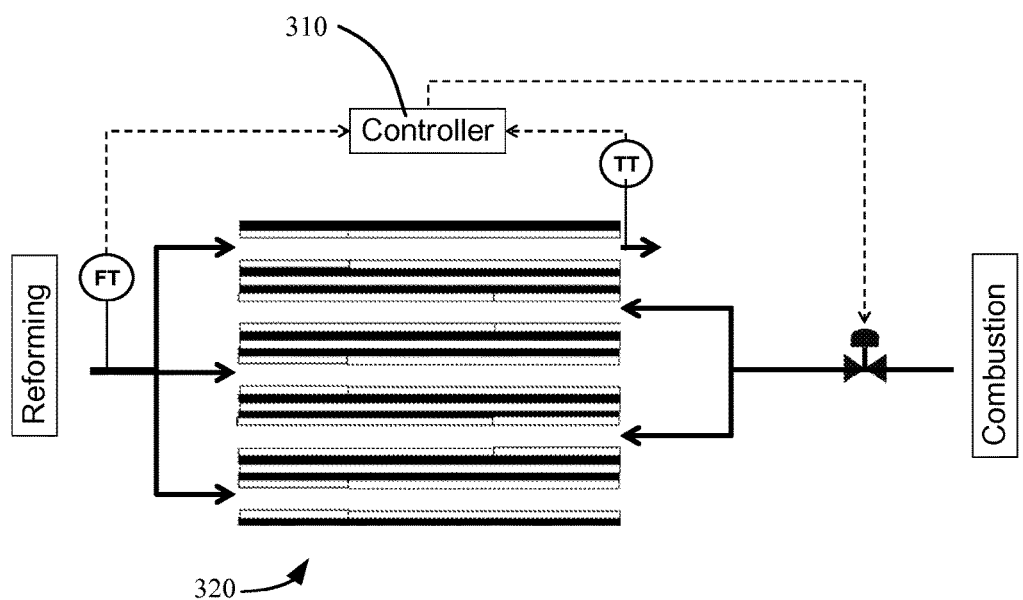
FIG. 3 is a schematic diagram of a controller for an autocatalytic microchannel reactor in accordance with the description herein.

FIG. 3 depicts a graphical illustration of a supervisory controller 310 employed in one embodiment of an autothermal catalytic plate reactor 320. Some embodiments of autothermal catalytic plate reactor 320 may have both a distributed temperature controller including a phase change material and a supervisory controller 310 configured to control of one or more inputs into reactor 320. This configuration may also be referred to as a hierarchical control structure, whereby the PCM layer acts as a fast, distributed controller, and the supervisory controller acts over a longer time horizon to mitigate persistent disturbances. More details regarding the controllers will be discussed below.

Catalytic Plate Reactor (CPR) System Modeling

A CPR model consisting of a catalytic plate with the adjacent reforming and combustion half-channels, in a countercurrent flow configuration was considered. The gas phase in each channel was modeled as a two-dimensional laminar convection-diffusion-reacting flow. A two-dimensional heat conduction in the wall plate and a one-dimensional reaction diffusion equation were employed to capture the reactant composition in the catalyst layers. The boundary conditions were set up as no-flux (the channel outlets), equal flux (at the fluid-solid interface) and symmetry (at the channel centers). The use of the symmetry boundary condition ensure that the simulation results derived from the use of this model are representative of the behavior of a reactor with a larger number of channels. The inlet velocity profile was assumed to be fully developed parabolic laminar flow between two infinite parallel plates. The detailed model equations can be found elsewhere. See, for example, M. Zanfir, M. Baldea, and P. Daoutidis, "Optimizing the Catalyst Distribution for Countercurrent Methane Steam Reforming in Plate Reactors," *AIChE J.*, vol. 57, no. 9, pp. 2518-2528, 2011; M. Zanfir and A. Gavriilidis, "Catalytic combustion assisted methane steam reforming in a catalytic plate reactor," *Chem. Eng. Sci.*, vol. 58, no. 17, pp. 3947-3960, 2003. An optimized, offset catalyst distribution is assumed. See, for example, M. Zanfir, M. Baldea, and P. Daoutidis, "Optimizing the Catalyst Distribution for Countercurrent Methane Steam Reforming in Plate Reactors," *AIChE J.*, vol. 57, no. 9, pp. 2518-2528, 201. An offset catalyst distribution was used in order to provide an optimal synchronization of the heat generation and consumption fluxes in the exothermic, and respectively, endothermic channels. The catalytic combustion rate was assumed to be first-order with respect to methane and zero-order with respect to oxygen. Homogeneous combustion has a measureable impact at high temperatures and is accounted for with reaction rates being of order −0.3 and 1.3 in methane and oxygen, respectively.

It was assumed that the following set of reactions is occurring in the reforming channel, with the reaction kinetics as given in: J. Xu and G. Froment, "Methane steam reforming, methanation and water-gas shift 0.1. Intrinsic kinetics," *AIChE J.*, vol. 35, no. 1, pp. 88-96, 1989.

Methane Steam Reforming

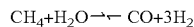

ΔH=+206 kJ/mol

Water-Gas-Shift

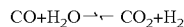

ΔH=−41 kJ/mol

Reverse Methanation

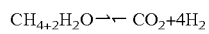

ΔH=+165kJ/mol

The catalytic combustion of methane occurs in the combustion channels:

Methane Combustion

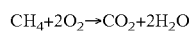

ΔH=−803 kJ/mol.

In some embodiments, the reactor may produce Fischer-Tropsch liquids or Fischer-Tropsch intermediates using the products produced in the reforming channel or the combustion channel.

Reactor System with Latent Energy Storage Layer

The melting and solidification of materials are phase transformations that involve latent heat exchange with the environment, occurring at constant temperature. Owing to this property, PCMs have found applications in thermal energy storage. See, for example, W. Cole, K. Powell, and T. Edgar, "Optimization and advanced control of thermal energy storage systems," *Rev. Chem. Eng.*, 2012. Through its melting-solidification cycles, the PCM acts as an energy storage buffer that mitigates temperature excursions. Thus, confining a PCM with an appropriately selected melting point (i.e., with a phase transition temperature above the maximum nominal operating temperature and below the maximum safe operating temperature) between the plates of a CPR thus has the potential to prevent local temperature rises in the presence of disturbances which would, under other circumstances, give rise to hot-spots.

The choice of PCM is influenced by the desired operating temperatures for the reactor. It should be noted that, in addition to a suitable melting point, the material chosen for the PCM layer should not impede on the heat transfer between the exothermic and endothermic channels. Consequently, materials with high thermal conductivity may be preferred for the PCM in some embodiments. For example, in one embodiment the reactor may be constructed from RA446 high-chromium steel with copper (melting point 1084° C.) as the PCM. In another embodiment the reactor may be constructed of 316 L stainless steel with a cobalt-titanium eutectic (melting point 1020° C.) as the PCM. In one embodiment, the phase change material may be copper. In another embodiment, the phase change material may be substantially copper. In one embodiment, the phase change material may be an alloy which includes a preponderance of copper. In other embodiments, the phase-change material is any metallic alloy or other material having a melting point above the maximum designed operating temperature of the reactor, but below the maximum allowable operating temperature. In some embodiments, the use of a brass PCM layer may further lower operating temperatures; depending on composition, the melting temperature of brass ranges from 900 to 1000° C., with other physical properties being similar to copper. In other embodiments an alloy may be used for the PCM that includes two or more metals. In one embodiment a copper/silver alloy may be used with a melting temperature of approximately 780° C. Other alloys including three or more metals may be employed. The alloys may or may not be eutectic. The composition of the alloys may be modified to "tune" the melting temperature of the PCM. One of skill in the art may select an appropriate alloy from known phase diagrams such as those published by the American Society of Metals (ASM). In yet further embodiments, materials other than metals may be used as the PCM. In some embodiments a salt, such as but not limited to sodium chloride may be used. In one such embodiment the salt has a melting temperature of approximately 814° C.

In some embodiments, expansion of the PCM upon melting can lead to local modifications in the geometry of the walls. However, for most metals, this expansion is quite small (e.g., the liquid density of copper is 95% of the solid density at the melting point) and, consequently, it is expected that such geometric effects will not be deleterious. Furthermore, the malleability of most wall materials is high at elevated temperatures, which should increase tolerance to such events.

The parameters of the systems used throughout the simulations are described in Table I.

TABLE I

REACTOR SYSTEM DETAILS

| Parameter | Value |
|---|---|
| Reactor Length | 0.6 m |
| Half Ref. Channel Height | 1.0 mm |
| Half Comb. Channel Height | 1.0 mm |
| Ref. Catalyst Height | 20 μm |
| Comb. Catalyst Height | 20 μm |
| Lref | 9.0 cm |
| Lcomb | 15 cm |
| Ref. Inlet Temperature | 793.15 K |
| Comb. Inlet Temperature | 793.15 K |
| Ref. Inlet Compositions | 19:11% $CH_4$ |
| | 72:18% $H_2O$ |
| | 2:94% $CO_2$ |
| | 0:29% $H_2$ |
| | 5:48% $N_2$ |
| Comb. Inlet Compositions | 5:26% $CH_4$ |
| | 22:09% $O_2$ |
| | 72:65% $N_2$ |

A. System Modeling

In order to investigate the potential for using PCMs for local temperature control, the model in Section II was expanded considering that the channels are separated by two plates confining a PCM layer. The PCM was modeled using a two-dimensional moving boundary (Stefan) formulation. See, for example, V. Alexiades and A. Solomon, *Mathematical Modeling of Melting and Freezing Processes*. Washington D.C.: Hemisphere Publishing Corporation, 1993. The enthalpy of the PCM, rather than temperature, is used as the state variable to account for the discontinuities occurring at the melt boundary:

$$\rho \frac{\partial H^p}{\partial t} = \frac{\partial}{\partial z}\left(k\frac{\partial T}{\partial z}\right) + \frac{\partial}{\partial x}\left(k\frac{\partial T}{\partial x}\right) \quad (1)$$

where $\rho$ is the density, $H^p$ is the enthalpy, k is the thermal conductivity of the PCM. The PCM temperature T is calculated from enthalpy as:

$$T = \begin{cases} T_r + \dfrac{H^p}{\rho c_2} & H^p < c_s(T_m - T_r) \\ T_m & c_s(T_m - T_r) \leq H^p < c_s(T_m - T_r) + \lambda \\ T_m + \dfrac{H^p - \lambda - c_s(T_m - T_r)}{cl} & H^p \geq c_s(T_m - T_r) + \lambda \end{cases} \quad (2)$$

where $T_r$ is a reference temperature, $c_s$ and $c_l$ are the specific heats of the solid and liquid PCM, respectively, $T_m$ is the PCM melting temperature, and $\lambda$ is the latent heat of fusion in the PCM. A "mushy region" approximation was used to alleviate the numerical difficulties associated with the discontinuity of thermal conductivity and heat capacity at the melting front. See, for example, V. Alexiades and A. Solomon, *Mathematical Modeling of Melting and Freezing Processes*. Washington D.C.: Hemisphere Publishing Corporation, 1993.

B. PCM Selection

In addition to a suitable melting point, the material chosen for the PCM layer should, intuitively, not impede on the heat transfer between the exothermic and endothermic channels. Consequently, materials with high thermal conductivity may be preferred in some embodiments. Some embodiments may employ copper ($T_{melt}$=1083·C, k=352 W/mK) as the PCM which is cost effective and has a relatively high thermal conductivity. In some embodiments a PCM is selected with a thermal conductivity greater than 100 W/mK. In other embodiments a PCM is selected with a thermal conductivity greater than 300 W/mK.

C. Steady State Performance

The mathematical model was implemented and solved in general Process Modeling System (gPROMS). See, for example, Process Systems Enterprise, "general PROcess Modeling System (gPROMS)," www.psenterprise.com/gproms, 1997-2012. Backwards finite differences were used to discretize the axial domain in the reforming channel, the reforming catalyst layer, and the solid wall on the reforming side. Forward finite differences discretize the axial domain in the combustion channel, the combustion catalyst layer, and the solid wall on the combustion side. A central finite differences discretization was used for the axial domain of the PCM, and orthogonal collocation of finite elements (OCFEM) was used for discretizing the partial derivative terms in the longitudinal direction in every layer.

Figure 4:
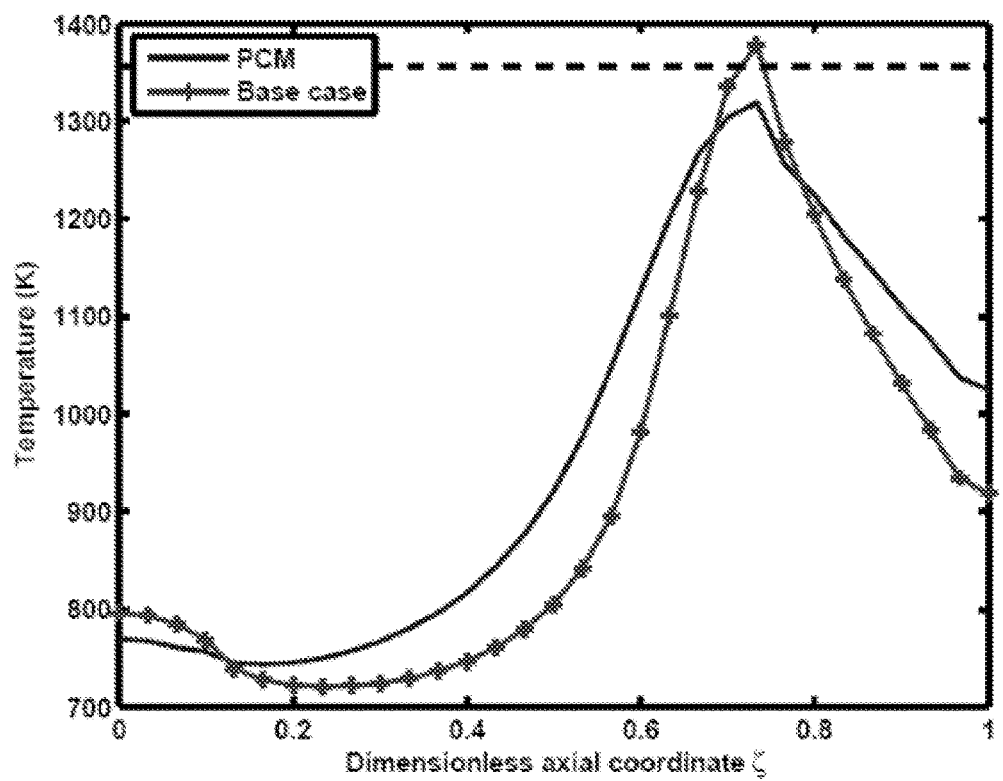
FIG. 4. Is a plot of axial temperature at steady state for a PCM-enhanced compared to a base case autocatalytic microchannel reactor in accordance with the description herein.
Figure 5:
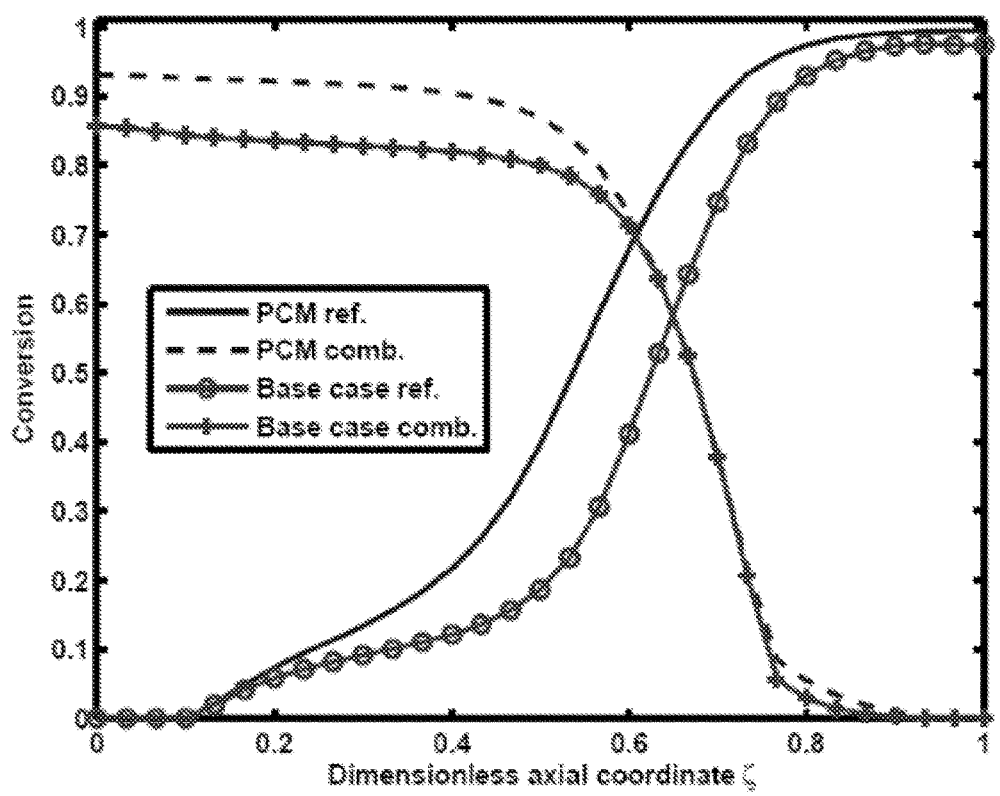
FIG. 5 is a plot of steady state axial conversion profiles for a PCM-enhanced compared to a base case autocatalytic microchannel reactor in accordance with the description herein.

FIGS. 4 and 5 compare the axial temperature distribution and conversion for the base case reactor and the PCM-enhanced reactors. The axial temperature distribution is oriented along the enclosed channels. FIGS. 4 and 5 illustrate that in some embodiments, confining a conductive PCM layer between the reactor plates of a CPR does not degrade the steady state reactor performance, but rather, improves performance with increased conversion in the combustion channel. The high thermal conductivity of the PCM enables a more uniform temperature distribution along the axial coordinate (owing to the high thermal conductivity of the copper layer), and a reduction of the maximum reactor temperature, which prolongs the life of the catalyst and ensures the structural integrity of the reactor.

Energy Storage Enhanced Temperature Control

A. Hierarchical Control Structure

The operation of CPRs are subject to fluctuations in the flow rate, composition and feed temperature of the reactants in both channels. Fluctuations that cause a reduction of the rate at which energy is consumed by the endothermic reactions (e.g., a reduction of the flow rate in the reforming channel) are likely to have the most deleterious effects. Their result is an excess of energy generated by combustion, with the evident potential for large, local temperature increases. In such cases, the confined PCM acts as a "buffer," absorbing the excess heat at constant temperature and preventing the formation of hot spots. In some embodiments, this temperature control effect may be limited by the thickness of the PCM layer. The buffer effect disappears once the PCM is completely melted, at which time (assuming persistent disturbances) the reactor temperature will continue to rise.

As a consequence, the implementation of PCM-based temperature control may be carried out as part of a hierarchical control structure, whereby the PCM layer acts as a fast, distributed controller, and a supervisory controller acts over a longer time horizon to mitigate persistent disturbances.

Practical considerations limit the supervisory controller configuration to boundary control, with the fuel flow rate to the combustion channels being the only available manipulated variable, and also limit its efficiency as a stand-alone control system (i.e., without the PCM layer used for distributed control). Specifically, the effectiveness of the boundary controller is strongly dependent on (and limited by) flow distribution among the numerous (possibly hundreds) millimeter-sized channels that form a reactor stack. As mentioned before, in some embodiments, it may not be possible to control the flow to individual channels; rather, a distribution device ("header") may be used to direct the stack inlet to each channel. Uniform and equal flow rates to each channel may not be established instantaneously and maldistribution can occur. Consequently, if the supervisory controller is used without the PCM layer, the time delays associated with flow distribution may be sufficiently long for hotspots to form in channels with preferentially high fuel flow, which may endanger the catalysts and structural integrity of the reactor.

B. Optimal Calibration of Distributed Controller

Physical arguments indicate that if the thickness of the PCM layer is much smaller than the thickness of the catalytic plates (i.e., $\delta PCM \ll \delta^1_s$ and $\delta PCM \ll \delta^2_s$), the complete (local) melting of the material may occur rapidly in the presence of disturbances, and the temperature control effect of the PCM may be short-lived. In this case, however, the PCM layers will not contribute significantly to the total height and mass of the reactor stack. Conversely, if a thicker PCM layer is used, local temperature control will extend over a longer period of time, with the disadvantage that the reactor stack will be larger. In practical applications, stack height and mass are important factors: the operating principle of CPR is centered on flexibility and deployability in a broad range of environments, including mobile applications such as off-shore platforms. In some embodiments, the cost of the PCM-enhanced reactor is largely determined by manufacturing costs, rather than the cost of the PCM itself, and will likely not vary significantly as a function of the cost of the phase-change material.

In light of the above, the dynamic effect of the PCM layer may be directly dependent on its geometry, and determining the layer thickness is akin to "tuning" the controller. In some embodiments, the PCM layer thickness is fixed at manufacturing and such "tuning" cannot be carried out online. Dynamic optimization represents a natural framework for determining, off-line, the optimal thickness of the PCM layer. Intuitively, the objective function should account for i) the deviation of the peak reactor temperature from a desired target and, ii) the weight penalty of increasing the thickness of the PCM layer. A further complication arises from the fact that the operation of the reactor is subject to fluctuations in the reforming flow rate. The optimization calculations should therefore be stochastic in some embodiments, and aimed at minimizing the likelihood of the peak temperature exceeding the temperature target, rather than considering the worst-case scenario of a significant disturbance (which, as mentioned before, would result in a very large PCM layer thickness).

Optimization calculations may be based on uniting dynamic optimization with concepts from nonlinear system identification. The method includes identifying one or more potential disturbances affecting the operation of an autothermal catalytic plate reactor and expressing them as pseudo-random multi-level signals. Specifically, the reforming flow rate is represented as a pseudo-random multi-level signal, PRMS, which is imposed on the reactor during the dynamic optimization iterations (time-integration steps in an optimization calculation). The geometry of the distributed temperature controller is then adjusted to minimize the temperature effects of one or more potential disturbances.

The objective function to be minimized (Eq. 3) consists of the time integral of the deviations of the temperature from the PCM melting point, and a penalty for the thickness of the PCM. The PCM thickness is $\delta$, the cost penalty per unit thickness is c, the peak reactor temperature is Tmax and H(x) is the Heaviside function. The optimization time horizon, $t_{final}$, is fixed.

$$J = c \times \delta + \int_0^{t_{final}} H(T_{max}(t) - T_m) \times (T_{max}(t) - T_m) \, dt \quad (3)$$

The optimization calculations proceed according to the following algorithm:

---

Make an initial guess for PCM thickness, $\delta^0$
while $\|\delta^k - \delta^*\| \geq \in$ do
   Simulate reactor from t = 0 to tfinal imposing the PRMS disturbance
   Calculate objective function (Eq. 3)
   Calculate objective function gradient and gradient of the constraint function:

$$\frac{dJ}{d\delta}, \frac{d^2J}{d\delta^2}$$

Update $\delta$
end while.

---

Imposing the PRMS disturbance in the course of the dynamic simulation, along with the time-integral objective function and a sufficiently long time horizon, allows the system to efficiently sample its possible states in a Monte Carlo fashion.

The proposed algorithm affords considerable freedom in selecting the update method for the decision variables.

C. Supervisory Control

As mentioned earlier, the role of the supervisory controller is to reject persistent disturbances in the flow rate and composition of the feed streams. Fulfilling this role is limited by practical considerations to a boundary-control approach, where a limited subset of the inputs and outputs of the CPR can be measured or manipulated. The former includes the output temperatures of the two channel sets, whereas the latter is likely confined to altering the flow rate of the fuel stream. Composition measurements can, in principle, be obtained via gas chromatography, but the cost of the associated hardware is high. As a consequence, in some embodiments, the structure of the supervisory controller may follow a combined feedback-feedforward paradigm, with the feedback component relying on temperature measurements from the reforming channel, and the feedforward component using information provided by a flow sensor placed on the reforming channel feed stream. In some embodiments, this sensor may be located upstream of the distribution header. A controller design approach may be more difficult to prescribe a priori. In principle, any of the available inversion- or optimization-based linear or nonlinear controller design methods are applicable. However, the choice of controller design may be complicated by the distributed-parameter nature of the system and may depend on the availability of an appropriate mathematical model. Although the closed-loop time constant for the supervisory control tier can be chosen to be relatively long, it is evident that the large dimensions and stiff, multiscale nature of the detailed mathematical model described in the previous sections may prohibit its use for online applications, in particular when optimization calculations are necessary, for example, in the case of model-predictive control.

In order to compensate for sustained disturbances in the inlet flow rate to the reforming channel, a feedforward supervisory controller was considered, which adjusts the inlet flow to the combustion channel based on measurements of the reforming inflow, $$u_{comb}^0 = R \times u_{ref}^0 \quad (4)$$

where $u_{ref}^0$ and $u_{comb}^0$ are the inlet flow rates to the reforming and combustion channels, respectively. R is the ratio of reforming to fuel flow rates. In the present case, R=1 based on energy balance considerations at nominal operating conditions.

EXAMPLE

A. PCM Layer Optimization

The algorithm disclosed above was used to determine the optimal thickness of the PCM distributed control layer for a reactor with the nominal parameters presented in Table I. It was assumed that the reforming flow rate (as determined by the inlet velocity to the reforming channels) can exhibit both positive and negative variations, with an amplitude of up to 50% of the nominal value, assuming a uniform distribution of the inlet velocities in time.

Figure 6:
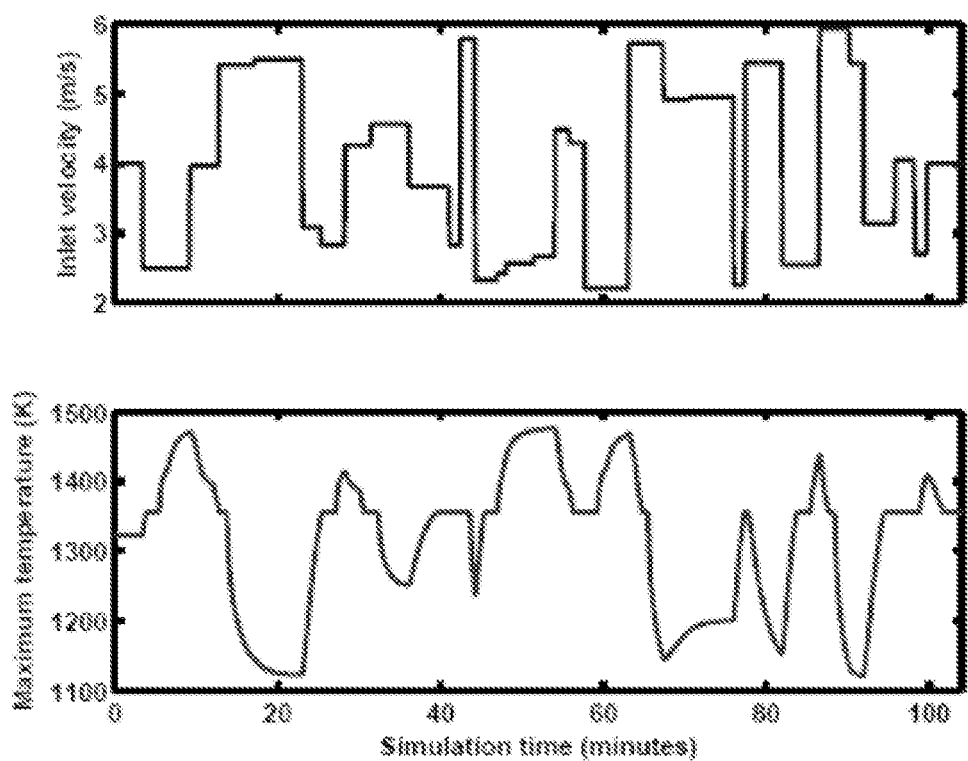
FIG. 6 is a plot of a multi-level random signal of reforming inlet velocity and corresponding excitation of a PCM-enhanced system for an autocatalytic microchannel reactor in accordance with the description herein.

In order to compute the PRMS required by the proposed optimization algorithm, a frequency analysis on the nominal system was performed. Based on physical considerations, the PCM layer must reject disturbances with frequencies within a bounded range. Due to the elevated thermal inertia of the plates and PCM layer compared to the gas phase, the reactor may naturally filter high frequency disturbances. Conversely, the time constant for flow distribution to the channels dictates the lower limit of the frequency range; lower-frequency disturbances can be addressed by the supervisory controller. The upper bound of the frequency range was computed using a simple linear analysis, whereby a series of disturbance step tests were performed on the base-case reactor to obtain an approximate first order transfer function model relating the maximum plate temperature to the reforming flow rate. It is assumed that frequencies just above the corner frequency (10-1 rad/s) were filtered by the plates, and frequencies one order of magnitude smaller were filtered by the supervisory controller. These results indicate a switching time of the PRMS, tPRMS between 50 s and 350 s. FIG. 6 shows the PRMS used in the optimization (generated assuming that the durations of the steps tPRMS, are uniformly distributed) and the response of the reactor to these excitations, in the absence of the supervisory control layer. This also suggests that in some embodiments, the closed-loop time constant for the supervisory controller should be selected to be close to the upper bound of this interval.

Figure 7:
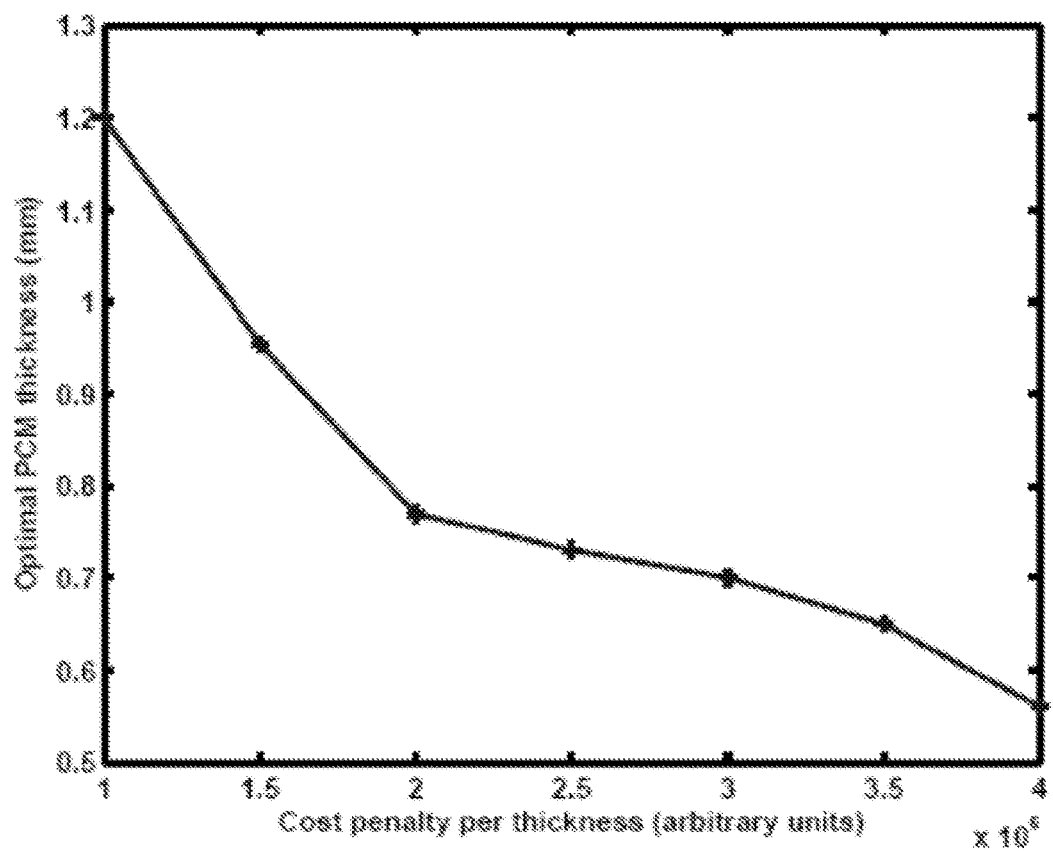
FIG. 7 is a plot of optimal PCM thickness as a function of the cost penalty, c.

The algorithm disclosed above was used to minimize the design objective function (3), subject to satisfying all the equations in the reactor model. The solution of this problem depends on the choice of the cost penalty c in Equation (3), which is influenced by the type of service and location that the reactor will be placed in. In some embodiments, low cost penalties will result in a thicker PCM layer and larger reactor stacks, with the PCM providing a strong temperature control effect. Conversely, in other embodiments, increasing c will diminish reactor stack size as well as the temperature regulation efficiency of the PCM layer. In order to investigate its effect on the solution of the optimization problem, the optimization problem was solved for several choices of c, with the results displayed in FIG. 7. As expected, lower cost penalties resulted in a reactor with a thicker PCM layer.

B. Supervisory Control

To compensate for sustained disturbances in the inlet flow rate to the reforming channel, an input-output linearizing feedback-feedforward controller was derived, which adjusts the inlet flow to the combustion channel based on measurements of the reforming flow and the exit reforming temperature, requesting a first-order closed-loop of the form $$T^{ref}\Big|_{z=L} + \tau_{CL}\frac{dT^{ref}|_{z=L}}{dt} = T^{sp} \quad (7)$$

where $\tau_{CL}$ is the closed-loop time constant (selected to be 240 s).

C. Control Performance

Simulation studies were performed to compare the transient operation of the PCM-enhanced CPR with the base-case reactor. The results shown below consider the worst-case scenario of a thin PCM layer, corresponding to the maximum value of the penalty c as described above. In this case, the optimal PCM layer thickness is $\delta_{PCM}$=0.56 mm, and the additional confined material accounts for about 18% of the total reactor volume and 60% of the total reactor weight. Table II displays parameters used in the case study highlighting the differences between the two systems.

TABLE II

| CASE STUDY PARAMETERS | | |
|---|---|---|
| Parameter | Base Case | PCM-Enhanced |
| PCM | N/A | Copper |
| PCM Thickness | N/A | 0.56 mm |
| Solid Wall Thickness | 0.5 mm | 2 × 0.3 mm |
| Nominal Ref. Inlet Velocity | 4.0 m/s | 4.0 m/s |
| Nominal Comb. Inlet Velocity | 4.0 m/s | 4.0 m/s |
| Feed Forward Ratio Constant | 1:1 | 1:1 |
| Comb. Flow Time Constant | 60 s | 60 s |

Figure 8:
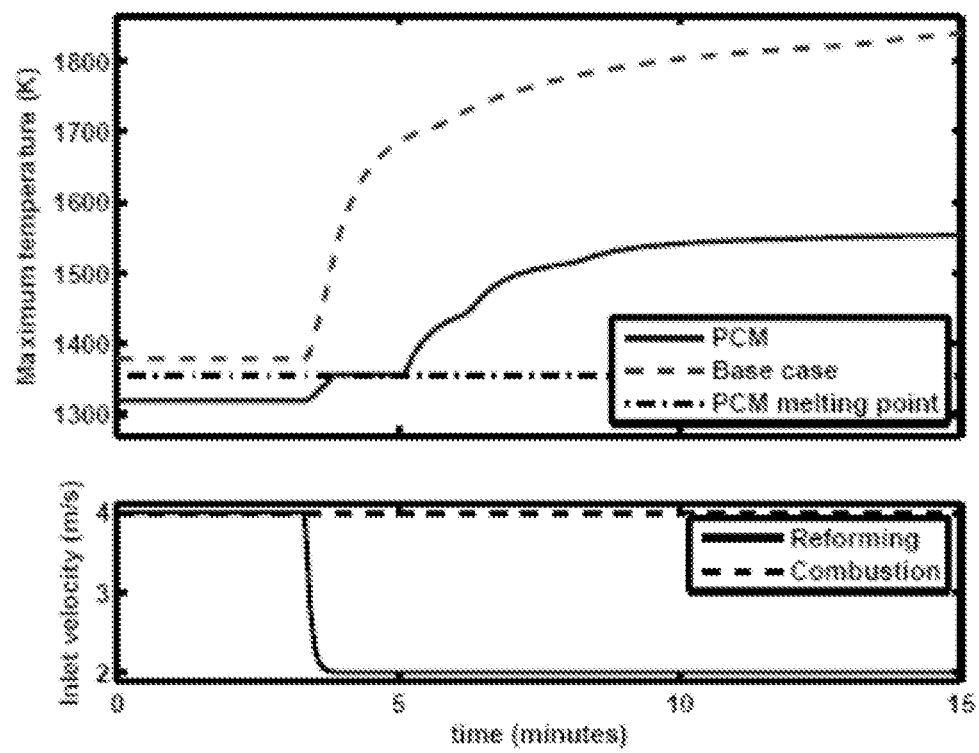
FIG. 8 is a plot of maximum reactor temperature responses in a base case and a PCM-enhanced autocatalytic microchannel reactor in accordance with the description herein.

FIG. 8 illustrates the evolution of the peak reactor temperature (notice that the location of the temperature peak in the z direction may shift in time), in response to a 50% decrease in the inlet velocity of reforming flow. As the reforming flow rate drops, the temperature in the reactor is expected to rise due to a decrease in the endothermic reaction rate. As seen in FIG. 8, the rise time to a new steady state is much longer for the PCM-enhanced reactor than in the base case. There is an initial temperature rise to the melting point, then the temperature remains constant at the melting point until the layer has completely melted. Subsequently, the temperature rises slowly to the new steady state maximum temperature as melting continues in the axial direction. Conversely, the temperature in the base case CPR rises very quickly, reaching a high value at which the structural integrity of the reactor would be compromised.

Figure 9:
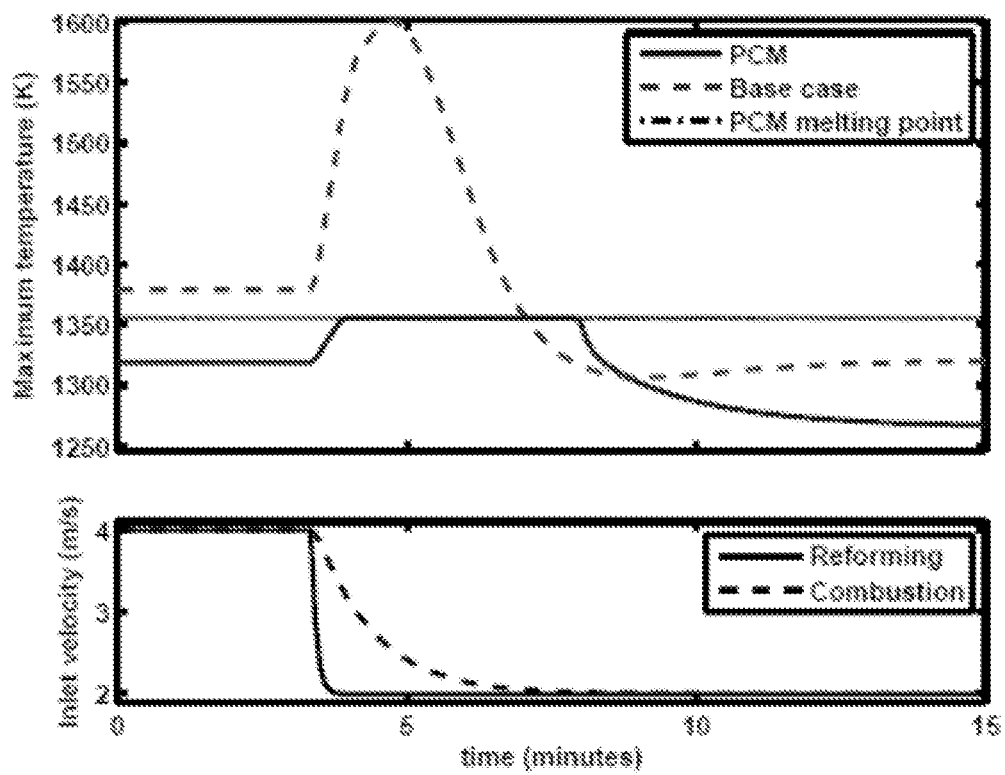
FIG. 9 is a plot of maximum reactor temperature in a base case and a PCM-enhanced reactor in the presence of a 50% drop in reforming flow rate for an autocatalytic microchannel reactor in accordance with the description herein.

FIG. 9 shows the performance of the proposed hierarchical control structure of one embodiment including the proposed feed forward controller during a step change in the reforming flow rate. For comparison purposes, the effect of implementing the feedforward controller on the base reactor is also shown. The PCM-enhanced reactor shows a superior dynamic performance with fast disturbance rejection and a lower maximum temperature at steady-state.

Figure 10:
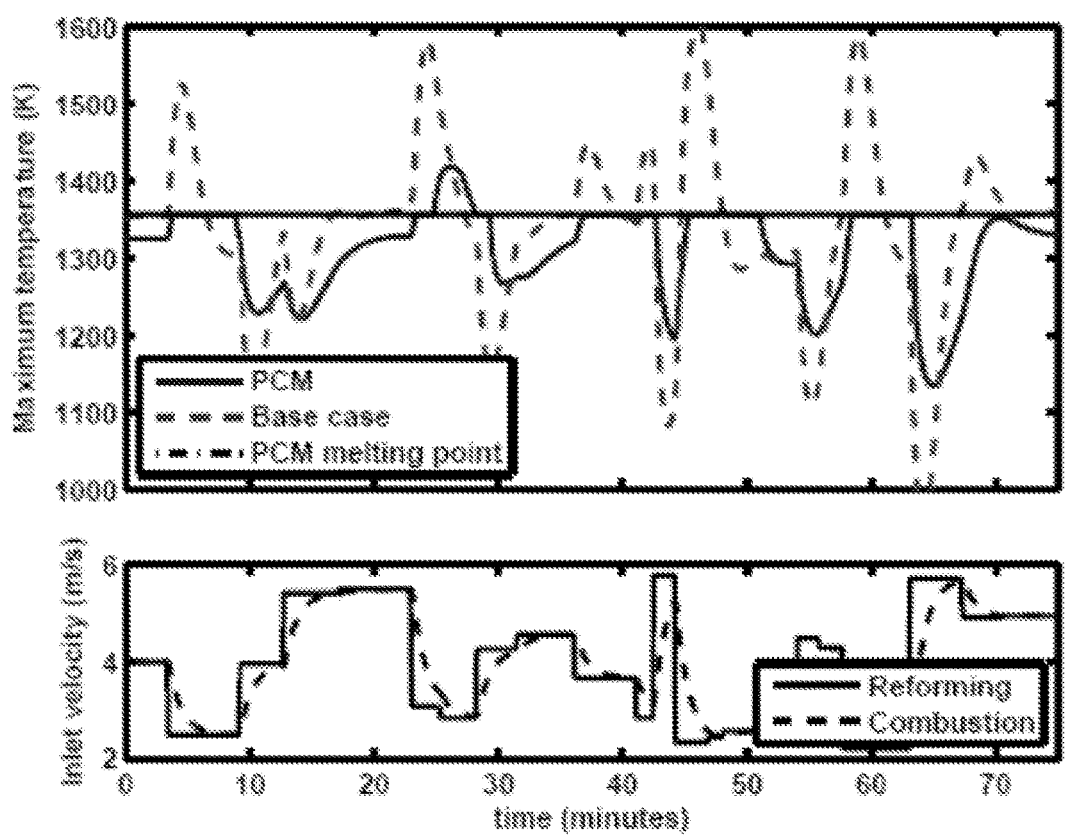
FIG. 10 is a plot of maximum reactor temperature responses in a base case and a PCM-enhanced autocatalytic microchannel reactor during a random disturbance sequence in accordance with the description herein.

FIG. 10 illustrates the maximum reactor temperatures in the PCM-enhanced reactor and the base case reactor when subject to a random disturbance sequence that is representative of an operating scenario of one embodiment. To analyze the benefit of the PCM layer, only disturbance frequencies similar to those used in the PRMS optimization were randomly implemented (50 to 350 second durations between disturbance steps, uniformly distributed). Higher frequencies are filtered in both reactors due to the thermal inertia of the wall, while lower frequencies are filtered by the supervisory controller in both reactors. The PCM-enhanced reactor under the proposed hierarchical control structure exhibits excellent disturbance rejection performance, while several potentially dangerous transients arise in the base-case system.

Figure 11A:
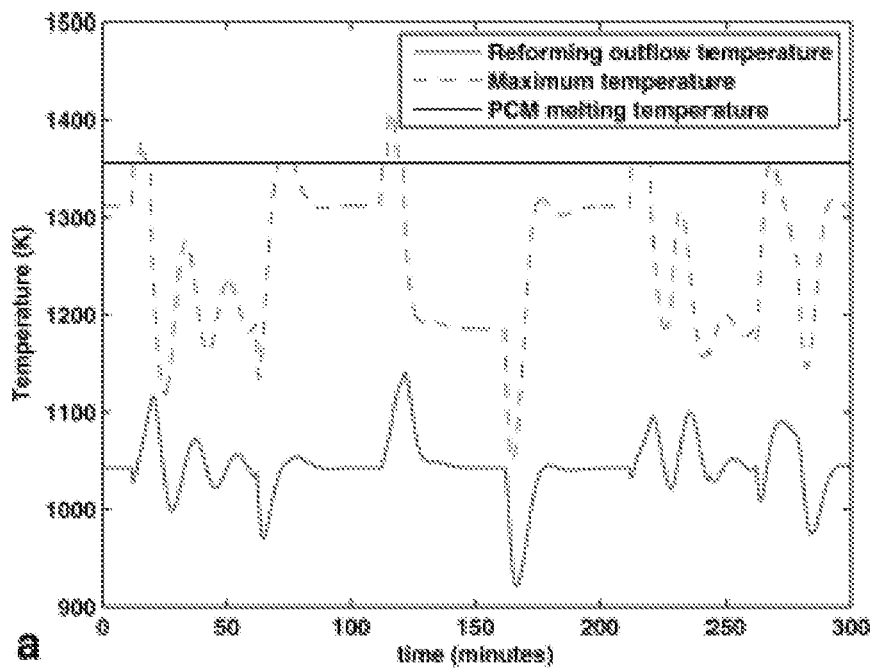
FIGS. 11A and 11B are plots of an autocatalytic microchannel reactor employing a supervisory controller during a disturbance signal in accordance with the description herein.
Figure 11B:
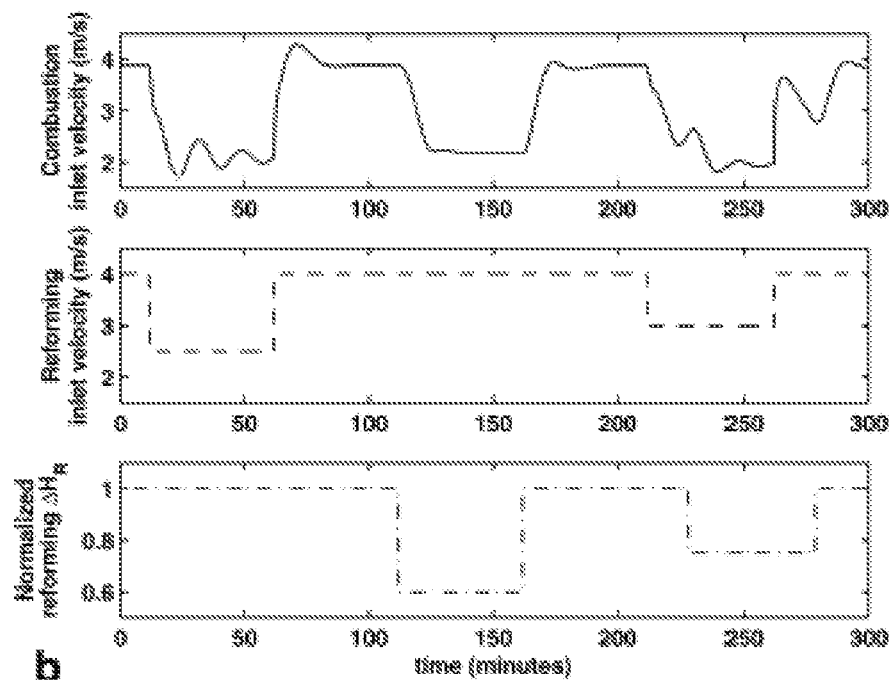

Simulations of one embodiment was performed with the supervisory controller operating in closed loop as illustrated in FIGS. 11A, and 11B. In FIGS. 11A and 11B, a 300 min closed-loop operating period was simulated, with sustained 40% drops, first in the reforming flow rate subsequently in the reforming inlet composition, followed by 30% simultaneous change in both aforementioned disturbances. The changes in flow rate are simulated as variations in inlet velocity, whereas the composition change is assumed to result in (and be reflected by) a decrease in the heat of reaction of the steam-reforming reactions. The results evince excellent control performance. It is also remarkable that, although the controlled variable is the reforming channel output temperature, the proposed control system is successful at preventing the advent of hotspots: the maximum longitudinal reactor temperature (FIG. 11A) only exceeds the melting temperature of the PCM on a brief occasion, which corresponds to a dramatic 40% drop in the amount of heat absorbed by the reforming reactions.

CONCLUSIONS

A temperature control concept for plate reactors with microscopic channels has been disclosed. One embodiment consists of confining a layer of phase-change material between the reactor plates. The melting-solidification cycles of the phase-change material serve as an energy storage buffer which absorbs excess reaction energy that may arise due to operational disturbances. The PCM layer thus acts as a distributed control layer that mitigates fast and potentially dangerous temperature excursions. This unconventional control system is augmented, in a hierarchical fashion, with a supervisory controller which rejects persistent disturbances. In some embodiments an optimization-based approach for identifying the optimal geometry of the PCM layer (i.e., for "tuning" the distributed controller) was disclosed. The proposed algorithm relies on ideas from non-linear system identification to represent potential disturbances as pseudo-random multilevel sequences (PRMS). A dynamic optimization calculation aimed at minimizing a time-integral design objective function was used. The PRMSs are imposed on the system during the time-integration steps in the optimization calculation, emulating a fast and effective Monte Carlo-type exploration of the disturbance space.

In another aspect, there is provided a method for producing synthesis gas from methane using the autothermal catalytic plate reactor disclosed herein. The method includes receiving methane and steam into the reforming channels and the combustion channels. The method further includes allowing the methane to contact the combustion catalyst layer thereby producing a combustion heat. The method further includes allowing the distributed temperature controller regulate the distribution of the combustion heat to the reforming layers. The method further includes allowing the methane to contact the reforming catalyst layers thereby producing syngas.

In one embodiment, the autothermal catalytic plate reactor is a microchannel reactor, as known in the art.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein are possible in view of the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, apparatus, articles of manufacture, and/or systems, which can, of course, vary. It is also to be understood that the terminology used herein is for the purpose of describing particular embodiments only, and is not intended to be limiting.

With respect to the use of substantially any plural and/or singular terms herein, such terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense as would be understood for the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense as would be understood for the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. A range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus for processing a first substance, the apparatus comprising:
   a first enclosed channel configured to transport the first substance;
   a second enclosed channel configured to transport a second substance; and
   a solid phase change layer disposed between, and thermally coupled to, the first enclosed channel and the second enclosed channel; wherein the solid phase change layer can transfer thermal energy from the second enclosed channel to the first enclosed channel;
   wherein the first enclosed channel further comprises a first catalyst configured to promote the chemical transformation of the first substance; and the second enclosed channel further comprises a second catalyst configured to promote the chemical transformation of the second substance.

2. The apparatus of claim 1, wherein the chemical transformation of the first substance is endothermic; and the chemical transformation of the second substance is exothermic.

3. The apparatus of claim 2 wherein the phase change layer is configured to change from a solid to a liquid when the exothermic transformation generates more energy than the endothermic transformation requires.

4. The apparatus of claim 2 wherein energy from the exothermic transformation in the second enclosed channel is conducted to the first enclosed channel and is sufficient to enable the endothermic transformation.

5. The apparatus of claim 1 wherein the phase change layer is configured to have a melting temperature above a normal/nominal operating temperature of the apparatus.

6. The apparatus of claim 1 wherein the phase change layer comprises copper.

7. The apparatus of claim 1 wherein the first substance comprises methane and water and the first catalyst comprises platinum.

8. The apparatus of claim 1 wherein the second substance comprises methane and oxygen or methane and air and the second catalyst comprises nickel.

9. The apparatus of claim 1 wherein the first enclosed channel is approximately parallel with the second enclosed channel.

10. The apparatus of claim 1, wherein the solid phase change layer comprises a metal alloy.

11. A catalytic reactor comprising:
    a set of enclosed reforming channels and a set of enclosed combustion channels separated by a solid phase change layer; wherein the solid phase change layer can transfer thermal energy from the combustion channels to the reforming channels;
    a reforming catalyst layer disposed in the enclosed reforming channels; and
    a combustion catalyst layer disposed in the enclosed combustion channels.

12. The catalytic reactor of claim 11 wherein the reactor is configured to operate in co-current flow mode.

13. The catalytic reactor of claim 11 wherein the reactor is configured to operate in counter-current flow mode.

14. The catalytic reactor of claim 11 wherein the phase change layer has a thermal conductivity greater than 100 W/mK.

15. The catalytic reactor of claim 11 wherein the enclosed reforming channels are configured to catalyze a methane steam reforming reaction and the enclosed combustion channels are configured to catalyze a methane combustion reaction.

16. The catalytic reactor of claim 11 wherein the reforming and/or combustion channels are configured to receive methane derived from a natural gas source.

17. The catalytic reactor of claim 11, wherein the solid phase change layer comprises a metal alloy.

18. A method of operating a reactor, wherein the reactor comprises:
    (i) a first enclosed channel which comprises a reforming catalyst disposed therein;
    (ii) a second enclosed channel which comprises a combustion catalyst disposed therein; and
    (iii) a solid phase change layer;
    wherein the first enclosed channel and second enclosed channel are separated by and in thermal contact with the solid phase change layer;
    wherein the method comprises:
    (a) flowing a first substance in the first enclosed channel, thereby reacting the first substance on the reforming catalyst disposed in the first enclosed channel; and
    (b) flowing a second substance in the second enclosed channel, thereby reacting the second substance on the combustion catalyst disposed in the second enclosed channel;
    wherein thermal energy transfers from the second enclosed channel, through the phase change layer, to the first enclosed channel.

19. The method of claim 18 wherein the reforming catalyst supports the endothermic reaction of the first substance; and the combustion catalyst supports the exothermic reaction of the second substance.

20. The method of claim 19 wherein the phase change layer is configured to change from a solid to a liquid when the exothermic reaction generates more energy than the endothermic reaction requires.

21. The method of claim 18 wherein the phase change layer is configured to have a melting temperature above a normal operating temperature of the reactor.

* * * * *